(12) United States Patent
Lesser

(10) Patent No.: US 7,082,470 B1
(45) Date of Patent: Jul. 25, 2006

(54) SEMI-AUTOMATED LINKING AND HOSTING METHOD

(76) Inventor: Joel Lesser, 270 Westbury La., Atlanta, GA (US) 30005-2518

( * ) Notice: Subject to any disclaimer, the term of this patent is extended or adjusted under 35 U.S.C. 154(b) by 1229 days.

(21) Appl. No.: 09/605,127

(22) Filed: Jun. 28, 2000

(51) Int. Cl.
G06F 15/16 (2006.01)

(52) U.S. Cl. ............... 709/232; 709/201; 709/219; 707/10

(58) Field of Classification Search ............ 709/224, 709/226, 246, 223, 227, 220, 218, 213, 229, 709/202, 203, 201, 219, 232; 707/5, 13, 707/3, 10, 100, 104; 705/14, 400, 36; 345/335, 345/854; 714/31; 712/2
See application file for complete search history.

(56) References Cited

U.S. PATENT DOCUMENTS

| | | | | |
|---|---|---|---|---|
| 5,855,020 A | * | 12/1998 | Kirsch | 707/10 |
| 5,935,210 A | * | 8/1999 | Stark | 709/224 |
| 5,974,455 A | * | 10/1999 | Monier | 709/223 |
| 5,995,099 A | * | 11/1999 | Horstmann | 345/335 |
| 5,999,929 A | * | 12/1999 | Goodman | 707/7 |
| 6,078,866 A | * | 6/2000 | Buck et al. | 702/2 |
| 6,115,545 A | * | 9/2000 | Mellquist | 709/220 |
| 6,185,587 B1 | * | 2/2001 | Bernardo et al. | 707/513 |
| 6,212,545 B1 | * | 4/2001 | Ohtani et al. | 709/202 |
| 6,212,649 B1 | * | 4/2001 | Yalowitz et al. | 714/31 |
| 6,282,567 B1 | * | 8/2001 | Finch et al. | 709/219 |
| 6,321,242 B1 | * | 11/2001 | Fogg et al. | 707/513 |
| 6,360,215 B1 | * | 3/2002 | Judd et al. | 707/3 |
| 6,389,458 B1 | * | 5/2002 | Shuster | 709/213 |
| 6,421,675 B1 | * | 7/2002 | Ryan et al. | 707/100 |
| 6,449,636 B1 | * | 9/2002 | Kredo et al. | 709/206 |
| 6,476,833 B1 | * | 11/2002 | Moshfeghi | 345/854 |
| 6,529,950 B1 | * | 3/2003 | Lumelsky et al. | 709/218 |
| 6,629,135 B1 | * | 9/2003 | Ross et al. | 709/218 |
| 6,662,230 B1 | * | 12/2003 | Eichstaedt et al. | 709/229 |
| 6,714,933 B1 | * | 3/2004 | Musgrove et al. | 707/10 |
| 6,745,204 B1 | * | 6/2004 | Hogue et al. | 707/104.1 |
| 6,868,389 B1 | * | 3/2005 | Wilkins et al. | 705/10 |
| 6,983,236 B1 | * | 1/2006 | Karlovac et al. | 703/22 |
| 2001/0044818 A1 | * | 11/2001 | Liang | 709/201 |
| 2002/0087577 A1 | * | 7/2002 | Manjunath et al. | 707/104.1 |
| 2002/0091907 A1 | * | 7/2002 | Pouliot et al. | 712/1 |
| 2003/0055816 A1 | * | 3/2003 | Paine et al. | 707/3 |
| 2003/0195901 A1 | * | 10/2003 | Shin et al. | 707/104.1 |
| 2004/0143600 A1 | * | 7/2004 | Musgrove et al. | 707/104.1 |

OTHER PUBLICATIONS

Ng et al, Designing Interactive Multimedia Learning System on Web using a New Graphical Navigational Design Technique, IEEE 1998.*

Lynch et al, Imprudent Linking Weaves a Tangled Web, 1997; www.computer.org/computer/co1997/r7115abs.htm.*

(Continued)

Primary Examiner—Thong Vu
(74) Attorney, Agent, or Firm—Stephen J. Stark; Miller & Martin PLLC

(57) ABSTRACT

A method for creating and hosting links between web sites. Specifically, the method of creating links includes providing an account Owner the opportunity to accept or decline a link proposed by a Webmaster. If the account Owner accepts the link request, the administrator creates the link on the account Owner's link page(s). Links are preferably categorized on the link page(s). Furthermore, links are preferably rotated on the link page(s) to provide the opportunity for more visibility of at least some links on a particular web page.

15 Claims, 8 Drawing Sheets

OTHER PUBLICATIONS

The RBSE Spider -Balancing Effective Search Against Web Load(1); mingo.info-science.uniowa.edu/eichmann/ww...der/Spider.html.*

Using Reinforcement Learning to Spider the Web Efficiently—Rennie, McCallum (1999); www.cs.cmu.edu/~mccallum/papers/rlspider-icm/99s.ps.gz.*

Using a neural network to extract biological information from a jumping spider database Adams, A.; Rienks, J.; Neural Information Processing, 1999. Proceedings. ICONIP '99. 6th International Conference on vol. 3, Nov. 16-20, 1999 pp. 1143-1149 vol. 3.*

Using Reinforcement Learning to Spider the Web Efficiently—Rennie, McCallum (1999) □□www.cs.cmu.edu/~mccallum/papers/rlspider-icml99s.ps.gz.*

A Machine Learning Approach to Building . . . — McCallum, Nigam . . . (1999) □□www.cs.cmu.edu/People/knigam/papers/cora-ijcai99.ps.*

Building Domain-Specific Search Engines with Machine . . . —McCallum, Nigam . . . (1999) □□www.cs.cmu.edu/~mcccallum/papers/cora-aaaiss99.ps.gz.*

* cited by examiner

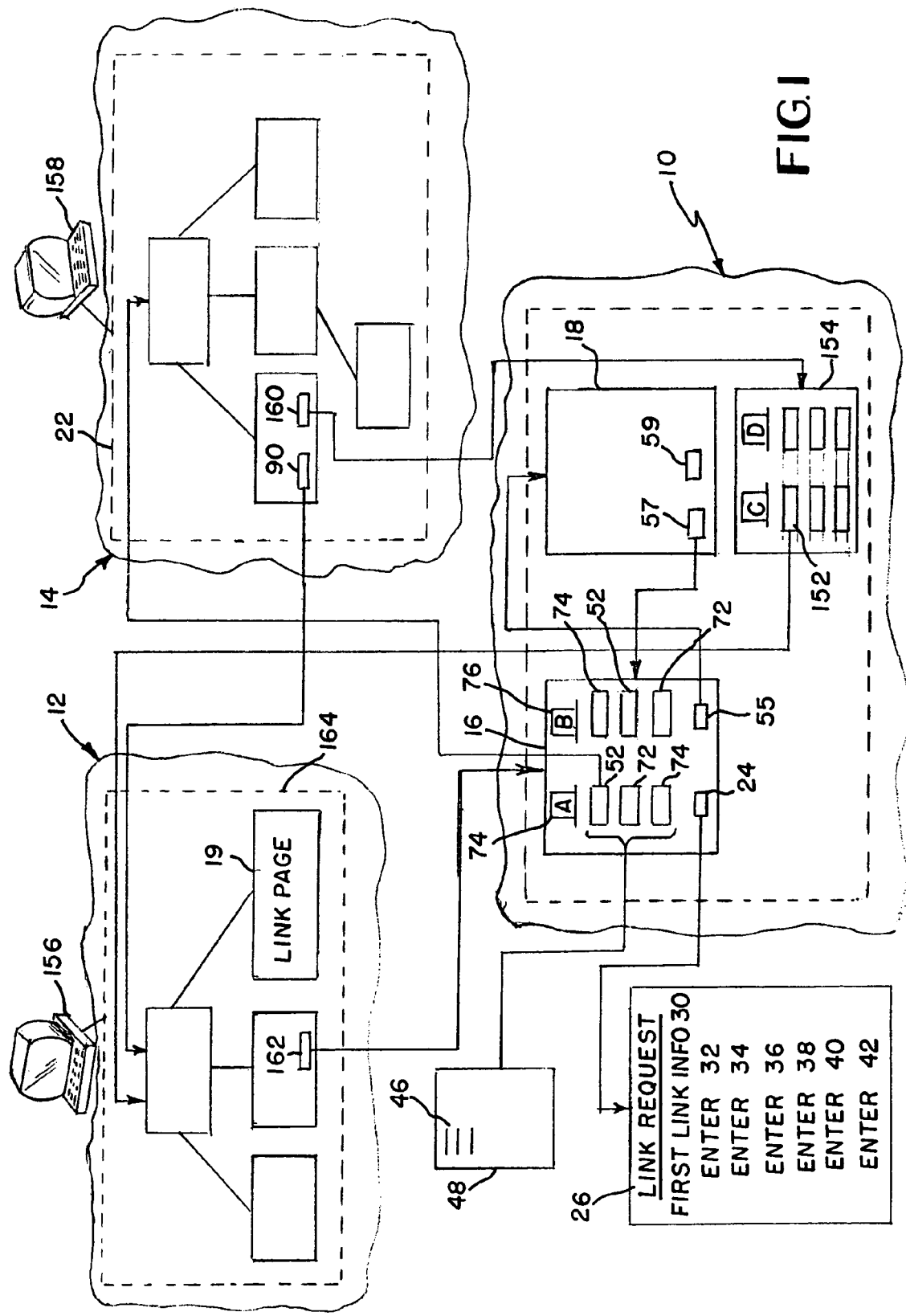

SEMI-AUTOMATED LINKING AND HOSTING METHOD

FIELD OF THE INVENTION

The present invention relates, in general, to the area of providing on-line Internet services. More specifically, this invention relates to a method for the semi-automated creation, maintenance, and management of links on subscriber websites utilizing a service website, upon which the invention resides.

BACKGROUND OF THE INVENTION

Glossary of Terms

Service Website: The website on which the invention resides and is accessible from.
Subscriber Website: A website whose owner has purchased a license to use the invention on the Service Website.
Subscriber Website Owner: The person contracting for the services provided by this invention, i.e. the Account Owner.
Subscriber Website Webmaster: The person who manages the Subscriber Website, and more specifically, would perform link maintenance and other technical support for the Subscriber Website. The Webmaster and Owner are sometimes the same person. Should the Webmaster be a different person, the Webmaster works for the Owner and takes direction from the Owner.
Webmaster: The person managing an other (i.e. non-subscriber) website on behalf of the Owner. When Webmaster is used in the text that follows, it is implied that the Webmaster is acting at the direction of the Owner.
HTML: Hypertext Markup Language is the code used to create a web page using an appropriate HTML Editor.

Description of Related Art

The Internet is a collection of computers linked together throughout the world. Some of these computers act as clients for their users. Other computers act as servers, or hosts, for one or more websites. Each website has a unique Internet Protocol (IP) address and these addresses are related to website names conventionally known as Universal Resource Locators (URLs). The URLs on a website's page(s) "point" to another site and are referred to as "links".

The Owners or managers of websites (Webmasters) all share a common interest: increased user traffic to their websites. A common way this is promoted among Webmasters is their mutual agreement to include links to each other's websites. Users will often utilize these links to navigate to other sites of interest, thus increasing traffic. Navigation is accomplished by the user operating a link by clicking his/her mouse on the link's web-page representation (i.e. the URL or some symbol, banner or icon representing the URL of the website). This process eliminates the need for the user to enter the URL by typing it into the web browser being used. By simplifying the navigation process, it's been discovered that users are more likely to visit more websites.

When two Webmasters agree to mutual links, these are often referred to as reciprocal links, because of their reciprocal agreement. Should one Webmaster remove a link to the other's website, the "offended" Webmaster needs to know the mutual agreement has been broken so that appropriate action can be taken. Checking for this situation manually is very time-consuming. Accordingly, a need exists to verify reciprocal links are still in place and operational.

In the typical linking process:
1. The Webmaster or Owner of Website B becomes interested in a reciprocal link with Website A.
2. Website B's Owner or Webmaster send an e-mail message to Website A's Webmaster (typically Webmaster@websiteA.com) identifying themselves (typically websiteB.com) and proposing a reciprocal link.
3. Website A's Owner or Webmaster visits Website B and determines his/her interest.
4. The Owners reach agreement and turn the technical task of implementing the links over to their respective Webmasters.
5. Typically, the Website A Webmaster fulfills his/her end of the agreement first by editing Website A's web page using an appropriate HTML editor and inserting the Website B's URL (converting the address text into a hyperlink) into the appropriate web page on Website A. This may be augmented by some symbol, banner, or icon (either physically-furnished or access-furnished) by Website B's Webmaster. If multiple links exist on a single page, it may be necessary to set the font of the link to correspond with other links on the page. Other parameters concerning the link may also need to be adjusted at this time by the Website A Webmaster, possibly including positional placement on the web page or other attributes.
6. Website A Webmaster then notifies the Website B Webmaster (typically by e-mail) saying "we've posted our link to you; you post ours". Of course, a variety of message types and/or wording could be utilized to convey the information in the message.
7. Website B Webmaster edits Website B's web page following essentially the same procedure as outlined in 5 above.

U.S. Pat. No. 5,995,099 (the '099 patent) describes a method of creating and maintaining page links between websites. This method has a link page (page A) as a portion of first Webmaster's website. By outputting first link information at page A, second Webmaster may then provide second link information to establish the links server which processes the second link information and automatically modifies page A to include a link to the second Owner without any intervention from the first Owner. (Note: We revert back to the term "Owner" rather than "Webmaster" because it is the term used in the '099 patent. While this correctly references the '099 patent, the use of these terms should not be confused. The '099 is a tool for an Owner, which is distinguishable from a tool for the Webmaster, although it has already established that some Owners are also Webmasters).

The practice of automatically linking the web page of the first Webmaster to the web page of the second Webmaster, without any intervention from the first Webmaster, is not believed to always be in the best interest of the first Webmaster. For example, suppose the first site is owned by a politician of a large political party and maintains a website supporting his/her beliefs and political party. A second Owner has a website for another large political party, and perhaps, is a political opponent of the first Webmaster. Under the teachings of the '099 patent, the second Owner (or his Webmaster) could establish a link from the first Owner's website. As another example, perhaps the first Owner is a pro-life activist that maintains a website and the second Owner advocates pro-choice through a website. Obviously, the first Owner may not likely desire the second Owner (or his Webmaster) to establish a link from the first Owner's site to the second Owner's site.

Accordingly, a need exists for a method of semi-automatically establishing links, and even bi-directional (or reciprocal) links between two websites. Specifically, a need exists for creating web sites, which greatly simplifies the traditional method of creating web sites, but still provides for approval from the first site's Webmaster to allow the second site's Webmaster to make a link to the first web site.

The '099 patent also teaches a method of verifying that links still correspond to active sites and that a second link, located at a particular page of the second site is present.

Once a link is established from the first Owner's site to the second Owner's site, the '099 patent requires the first Owner to organize the links which are provided by second Owners to the first Owner. At least one website: www.linkbank.com has been established by Keycrown Consultants Ltd. and Total Web Solutions Ltd. which allows a first Owner to group "related links" into a "hierarchal, annotated, searchable directory like Yahoo!(™)" on a web page hosted by LinkBank(™). For instance, if three links are established directing a user to three bookstore sites, an appropriate heading might be "Book Stores".

The LinkBank(™) site also appears to be capable of performing "slideshows" or linking to a site for a period of time and then transferring the user to another site for a period of time in order to present a "slideshow" of websites. Furthermore, data may be obtained as to the date, title, and popularity of links in order to prioritize the links associated with a particular website. However, this site is presently not capable of establishing links, which, apparently must first occur in the traditional manner by the first site Webmaster manually establishing the link.

This process is time consuming. Accordingly, a need exists to provide an improved method for establishing and/or categorizing links.

Furthermore, although the LinkBank website allows for "slideshows" and for categorizing "like Yahoo!(™)", other categorizing techniques defined by the site's Webmaster, are also desirable.

BRIEF SUMMARY OF THE INVENTION

The present invention is a method of utilizing an ADMINISTRATOR to automatically format and set up links for acceptance by the Subscriber Website Webmaster to a second website at the request of that site's Webmaster. Upon acceptance of the link, the Subscriber Website Webmaster can classify the second site's web page under at least one classification heading on a link page, maintained by ADMINISTRATOR as the preferred option of the Subscribing Website Webmaster. Additionally, in the preferred mode of operation, the links on a particular page, list or category are rotated. Rotation is utilized to ensure that links located toward the end of alphabetized set of links, can periodically appear near the beginning of the set of links, thus ensuring an even distribution of exposure to the user. Automatic rotation, at the preference of the Subscribing Website Webmaster, is an object of the present invention. Another object of the invention is to provide auto-rotation, at the Webmaster's option, of some, none or all of the links, which have been established on a web site.

Furthermore, it is an object of the present invention to provide a semi-automated linking capability to improve ease with which one establishes links between websites.

Still a further object of the invention is to utilize the ADMINISTRATOR to perform at least some of the detail oriented tasks such as:
1. initially setting the font for the links,
2. organizing the links,
3. rotating the links at the discretion of the Subscribing Webmaster.

The first website's Webmaster Owner may have access to change the work of the ADMINISTRATOR but the tasks performed by the ADMINISTRATOR decrease the work required to be performed by the first website's Webmaster.

BRIEF DESCRIPTION OF THE SEVERAL VIEWS OF THE DRAWINGS

The particular features and advantages of the invention as well as other objects will become apparent from the following description taken in connection with the accompanying drawings in which:

FIG. 1 is a schematic diagram of representative physical implementations in accordance with the present invention;

DETAILED DESCRIPTION OF THE INVENTION

Figure 2A:
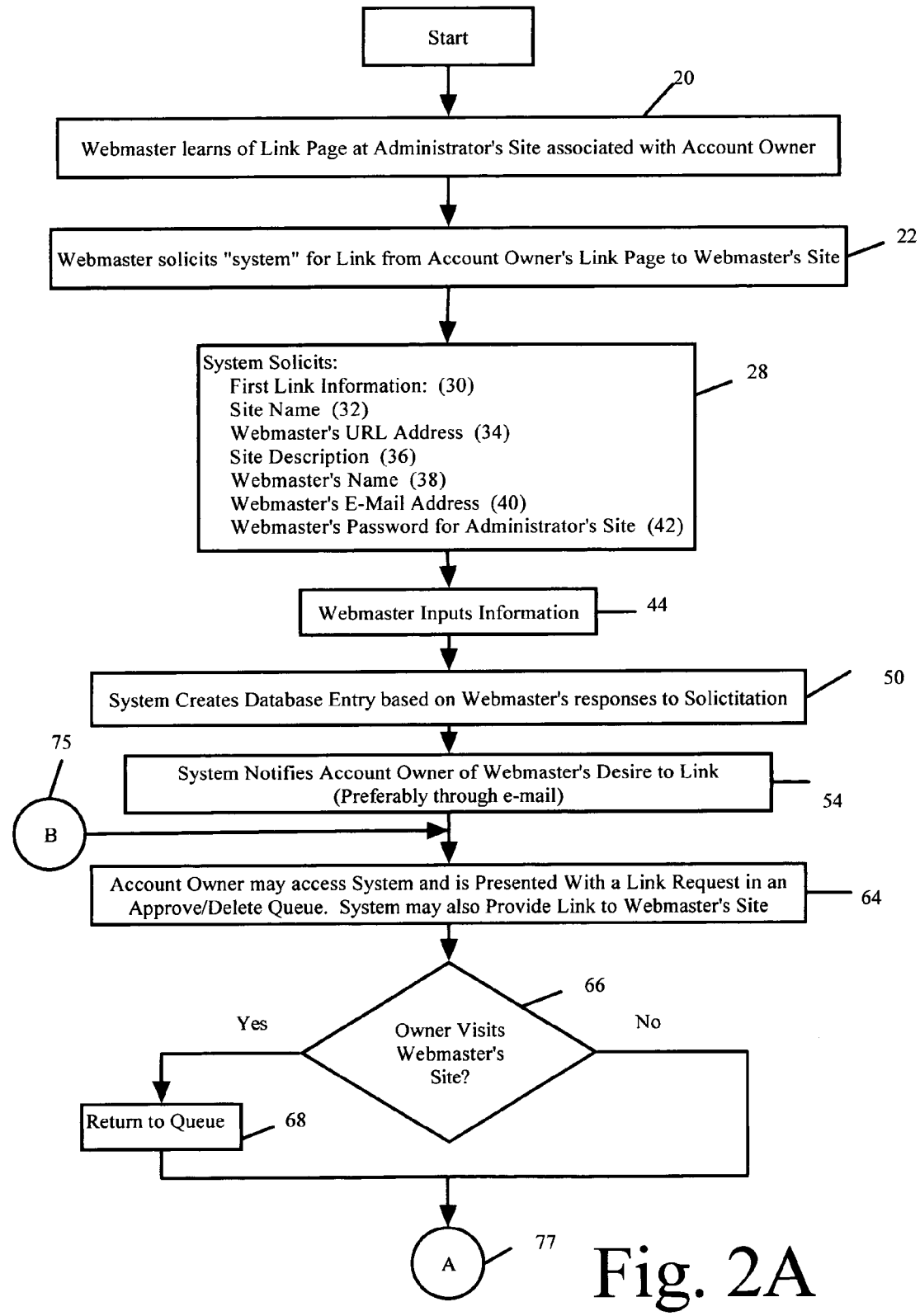
FIGS. 2A and 2B represent a flow chart illustrating the creation of a link embodiment utilized with FIG. 1.
Figure 2B:
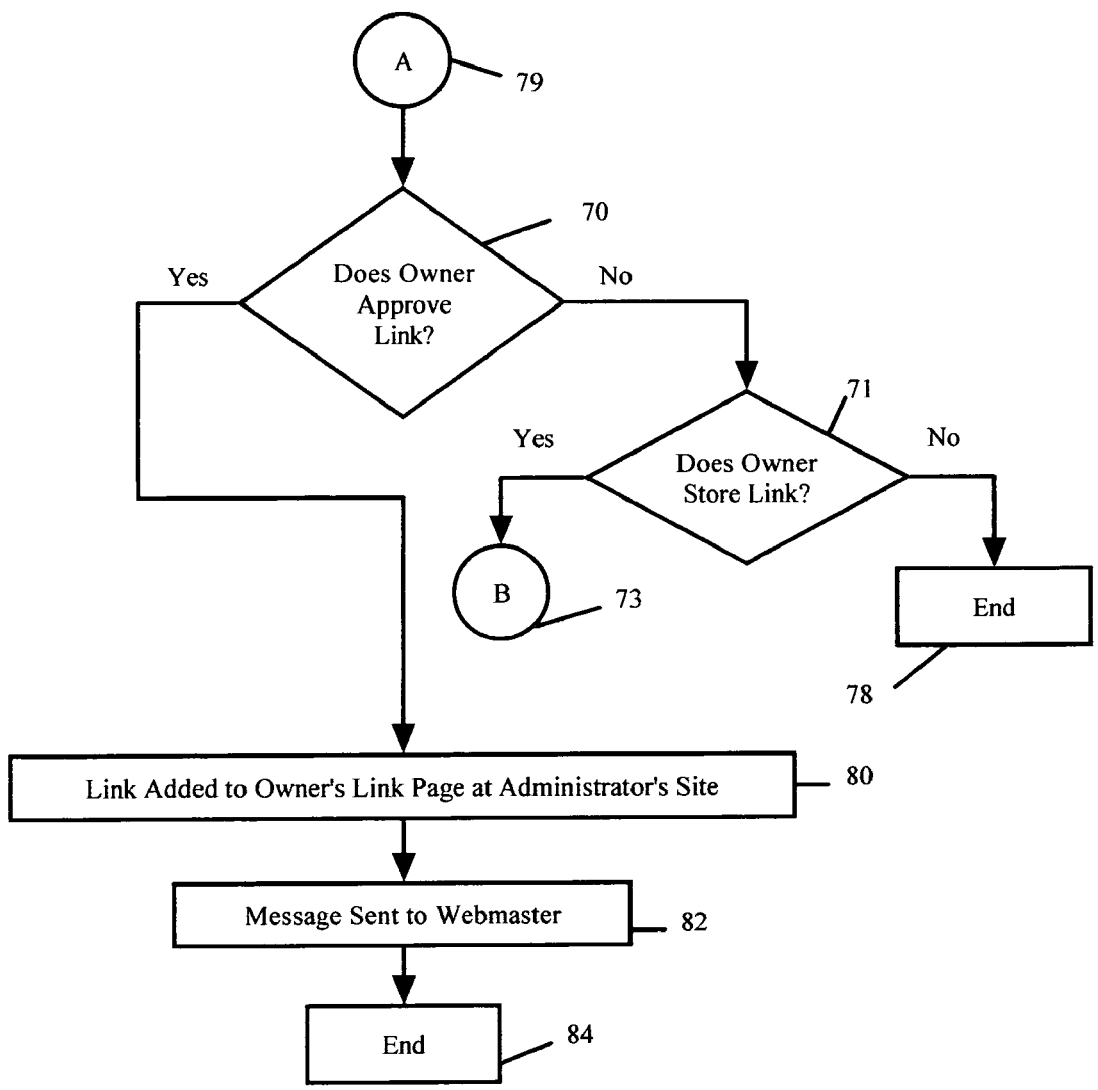
Figure 3:
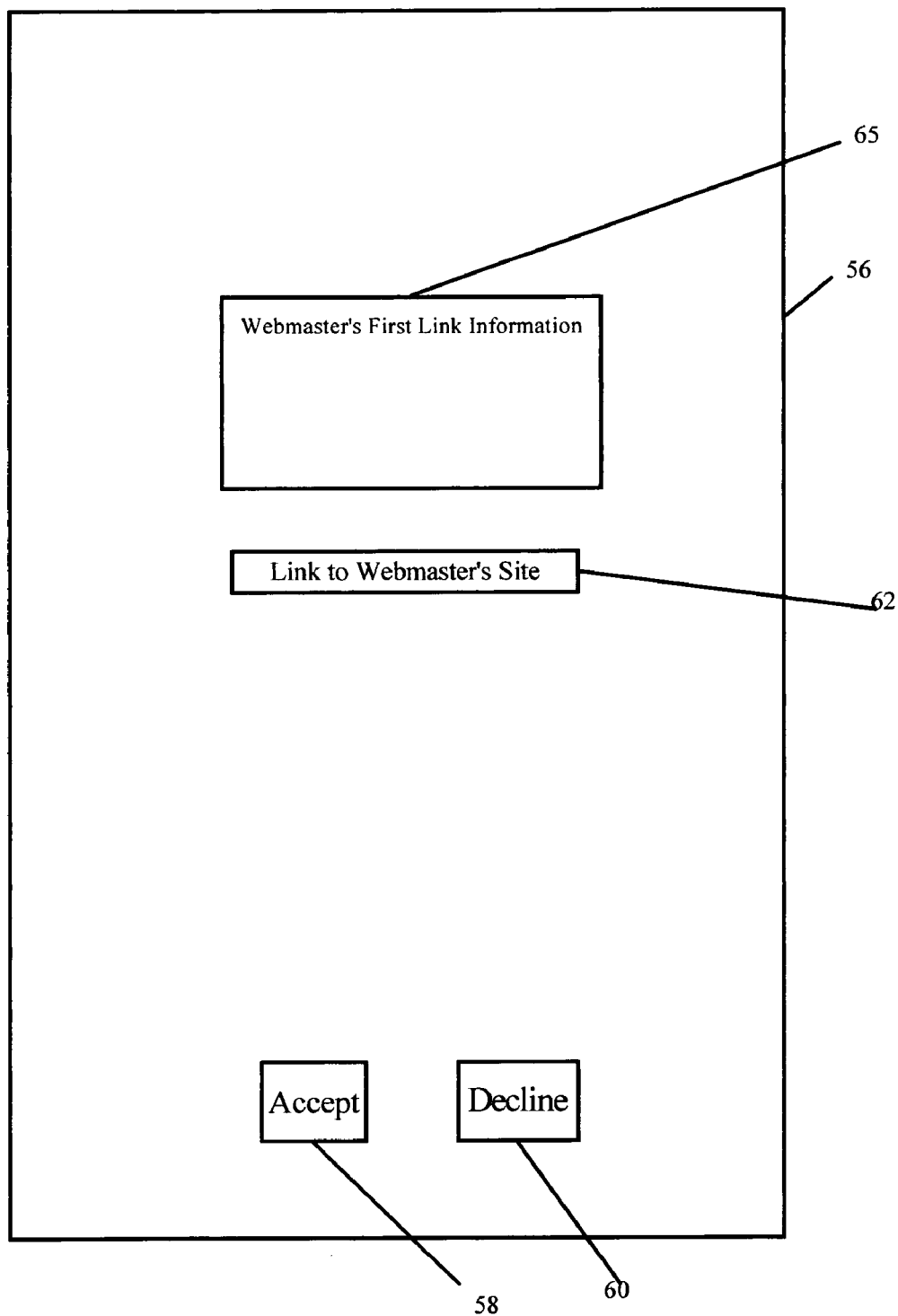
FIG. 3 is a schematic diagram of a queue utilized in the embodiment depicted in FIG. 1.

FIGS. 1 and 3 are graphical representations and FIGS. 2a, 2b, 4, 5a, 5b, and 6 are flow charts illustrating a preferred embodiments of several aspects of the invention. The method preferably includes three participants: an Administrator 10, an Account Owner 12, and a Webmaster 14. The administrator 10 is loosely defined as the system or entity, which maintains at least one link page 16, 18, 19 for the account Owner 12. The administrator 10 could be a portion of an account Owner's website, or more preferably a location at a separate server of the administrator 10 which is linked to account Owner's website. Although administrator 10, account Owner 12 and Webmaster 14 often refer to as systems herein, these terms may also refer to the individuals who run the systems as well. The method may be utilized on the Internet, the World Wide Web, Intranets, or any other grouping of linked computers.

Referring to FIGS. 1, 2a and 2b, the process begins at step 20 in FIG. 2a when a Webmaster 14 learns of a link page 16 controlled by account Owner 12. If Webmaster 14 desires to establish a link, such as first link 52, from account Owner's link page 16, preferably he/she will solicit the administrator 10, the person, program and/or system, for a link from the account Owner's link page 16 to the Webmaster's site 22 at step 22. This solicitation, or request, may be performed by activating button 24, such as an add-link button, on the link page 16, or through other known methods.

When the button 24, or other link, is activated, if utilized, a link request page 26 is preferably displayed to the Webmaster 14. The link request page 26 solicits the Webmaster 14 for information including the first link information 30 at step 28. It is preferred that the first link information 30 includes the URL address 34 of the Webmaster's site 22. Other information, including the Webmaster's site name 32, a site description 36 or other classification category of the Webmaster's website 22, the Webmaster's name 38, the Webmaster's e-mail address 40, and a password 42 for use with the administrator 10 may be requested at this time as well, or at a later time. Of course additional information could also be solicited at step 28, in one or more link request page(s) 26. Furthermore, all of the information listed above need not be obtained for the method to work according to the present invention. Nevertheless, at least the Webmaster's URL address 34 should be provided unless it may be obtained through other procedures.

At step 44 the Webmaster 14 inputs the first link information 30 and any other information solicited by the link request page 26 at step 28. When the Webmaster 14 has submitted the required information to the administrator 10, the administrator 10 creates a database entry 46 in a database 48, which is maintained by the administrator 10 at step 50. The database 48 may store database entries 46 from a plurality of account Owners 12. Furthermore, the database 48 may store a plurality of database entries 46 for any given account Owner 12. The use of the database 48 has been found to be useful in at least some program functions of the complete system of the preferred embodiment including the ability to check to determine whether any particular link is still linked to an active resource as discussed below.

After creating the database entry 46, the administrator 10 preferably notifies the account Owner 12 of the Webmaster's desire to create a first link 52 from the account Owner's link page 16 to the Webmaster's site 22 as illustrated in the form of a step in flow chart in FIG. 2a at step 54 and graphically in FIG. 1. The queue 56 preferably includes a display 65 which provides at least some of the information provided to the administrator 10 by the Webmaster 14 including the first link information 30 at step 64. Additionally, the queue 56 preferably includes a queue link 62 to provide access to the account Owner 12 to the Webmaster's site 22. Accept and decline buttons 58, 60 are also included for use by the account Owner 12.

Referring back to FIGS. 1 and 2a, if the Webmaster's site 22 is visited at step 66, the account owner 12 may then accept or delete one or more links in the queue 56. If any of the proposed links 56 are accepted at step 70, then the administrator 10 adds the first link 52 to the account Owner's link page 18 at step 80 as illustrated in FIG. 2B. Alternatively, the account Owner 12 may approve the link in the queue 56 at step 70. If the account Owner does not approve the link in the queue 56, the administrator 10 may ask the Webmaster 12 if the link at step 71. If deleted, the link is deleted at step 78. If the Webmaster 12 elects to store the link in the queue 56, step 73 directs to 75 where the queue 56 may be displayed again at a later time.

The administrator 10 preferably matches the font of the first link 52 with the fonts used in other first links 72, 74 on the account Owner's link page(s) 16,18. Furthermore, the administrator 10 preferably locates the appropriate position(s) to place the first link 52 relative to other first links 72,73. Specifically, in the preferred embodiment, at least one site description 36, such as category one 74 or category two 76 are requested during step 28. The administrator 10 may utilize this site description 36, category profile, or other information to categorize the first link 52 relative to the other first links 74, 76. In addition to an alphabetic ordering scheme, separate category ones and twos 74, 76 may also be utilized. Furthermore, only one grouping method could be utilized under many circumstances.

The Webmaster 12 may desire for there to be more than one first link 52 created on account Owner's link page 18 as illustrated in FIG. 1, particularly if Webmaster 14 believes Webmaster's website 22 may be appropriately categorized under two or more headings. The multiple locations of first link 52 may occur in one or both of category one 74 and category two 76.

Within a particular category, such as category one 74 or category two 76, the first links 52,72, 74 may be alphabetized or otherwise ordered. In the presently preferred embodiment, the account Owner 12 will be presented with the option of autorotation of links, which will be discussed in more detail below.

After the account Owner 12 decides to accept a link proposal in a queue 56, or approve the link 70, a message may be sent to the Webmaster 14, such as at step 82. This message may inform the Webmaster 14 of the creation of the first link 52. Additionally, the message may request a second link 90 from Webmaster 14 to account Owner 12. At step 84, the link creation process of the preferred embodiment is complete.

With at least two first links 52,72,73 created and displayed on an account Owner's link page 18, the administrator 10 may provide the account Owner 12 the opportunity to autorotate first links 52,72,73. Autorotation as defined herein means, "the reordering at a particular time of a set of links arranged in a first order to a second order which is different than the first order." In the preferred embodiment, the reordering process includes rotating the first links 52,72,73 in accordance with a formula. For the links displayed in FIG. 1 in column one 74, one example could be visualized as follows: suppose first links 52,72 begin with the letter "A" and first link 73 begins with the letter "B". The formula could be to place all listings beginning with "B" before any listing with "A", such as by taking the "A" listings and providing them at the end of the listing of links.

If this example were utilized, the resulting display would be the order as displayed in column two 76. In this manner, the next order would place all of the "C" listings at the top and so on. The formula could be any suitable formula or algorithm, which switches the order of the links.

The autorotation feature has been found helpful in displaying links at different locations in a listing so that the links may vary in exposure. Specifically if a person generally views a few links in a particular category, then it is unlikely that this particular person may ever view links at the end of a category. However, if the links are autorotated, links, which may have previously been at the end of a list, may be moved to where some may be present near the beginning, depending upon the particular formula utilized. Furthermore, after several successive autorotations, it is more likely that some of the links which began closer to the bottom of a particular listing will move closer towards the top of a particular listing.

Figure 4:
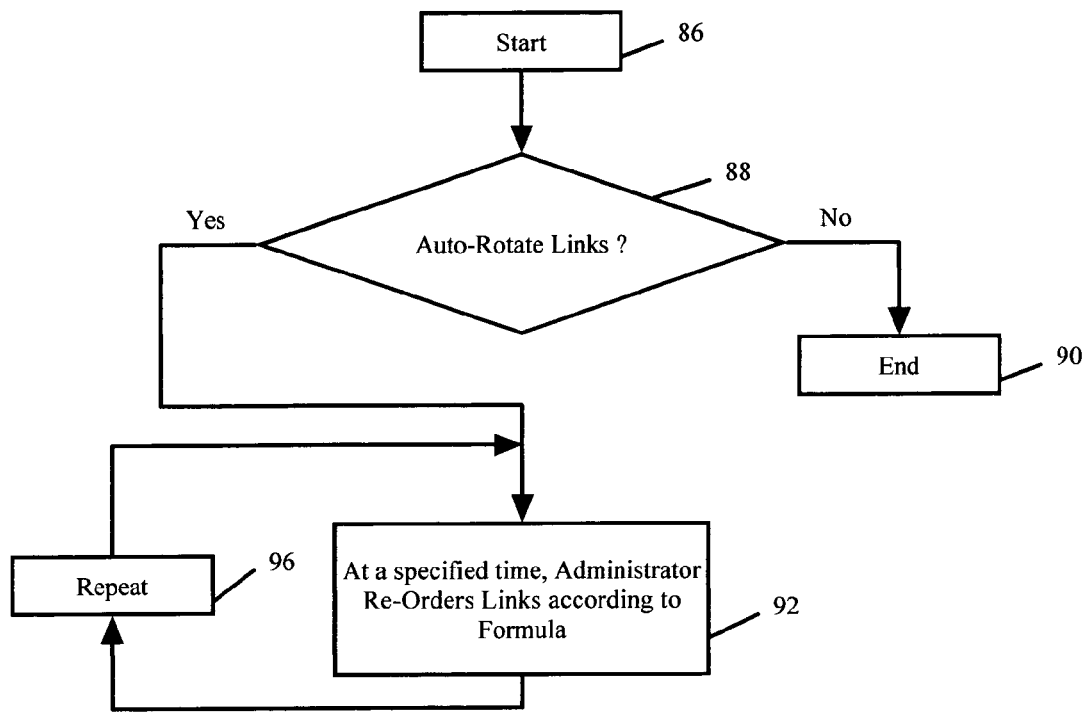
FIG. 4 is a flow chart illustrating the link rotation embodiment utilized with FIG. 1.

A flow chart of the autorotation feature is provided in FIG. 4. The process begins at step 86. The administrator 10 preferably solicits the account Owner 12 to determine whether or not the account Owner desires to autorotate the first links 52 at step 88. If the account Owner 12 does not desire to autorotate the links, then the procedure ends at step 90. Otherwise, if the account owner desires autorotation, then the administrator 10 re-orders links according to a routine, or formula, at step 92. The process is preferably repeated at step 96. Specified times may be according to an interval such as weekly, daily or other regular interval. Specified times may also be generated randomly by the administrator 10 or other entity.

Another useful feature of a link maintenance system is the ability to check for i.e., links which do not correspond to a hosted website, and reciprocal links. The method of the presently preferred embodiment is illustrated in flow chart form in FIGS. 5a and 5b. The process begins at step 92. The administrator 10 preferably solicits a account Owner 12 whether the feature of checking for dead first links 52, 72, 73 is desired at step 96. If the Webmaster does not desire to check for dead links, a variable A may be set to zero at step 98. If the Webmaster 12 desires to check for dead links, the variable A may be set to one at step 100.

In addition to dead link checking, the maintenance of the links may also involve checking for reciprocal links. At step 102, the Webmaster 12 may indicate a preference for reciprocal link checking. If reciprocal link checking is desired by the Webmaster 12 then second variable B may be set to one at step 106. If the Webmaster 12 does not desire to check for reciprocal links, then the variable B may be set to zero at step 104. The administrator 10 then has the necessary information for any given Webmaster 12 as to what kind of checks should be performed for that particular Webmaster 12. These variables may be stored in a database, such as database 48 in FIG. 1 and may be changeable by the account Owner 12 and/or administrator 10.

Figure 5A:
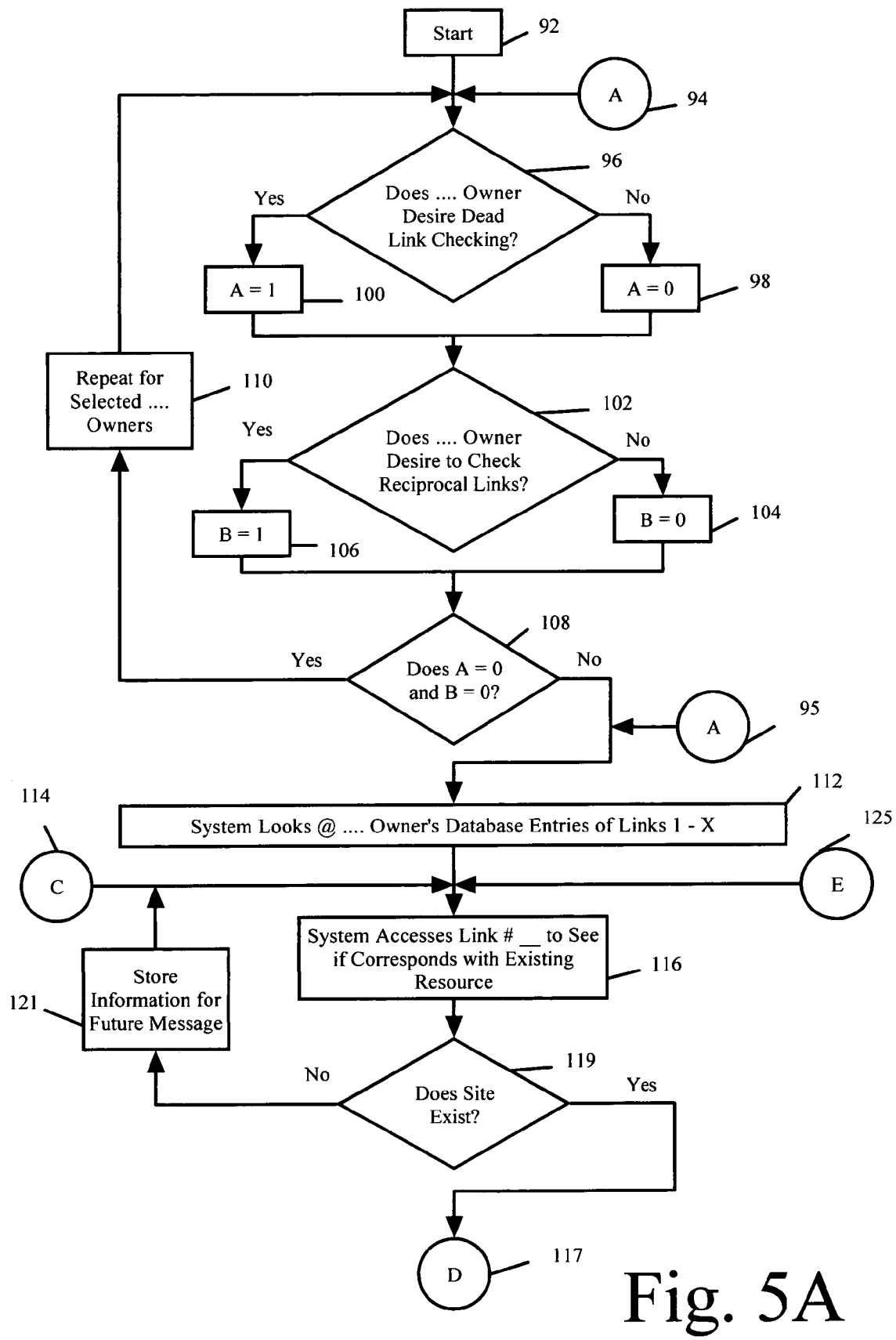
FIGS. 5A and 5B represent a flow chart illustrating the link verification embodiment utilized with FIG. 1.

Continuing along in FIG. 5a, for any given account Owner 12, the process of checking may begin. If both A and B equals zero at step 108, then the process may be repeated at step 110 for the next account Owner 12. When the account Owners 12 are exhausted, then the process may end. Supposing that at least one account Owner 12 desires some type of link to be checked, then the loop will be broken and the process will proceed to step 112.

At step 112, the administrator looks at a particular Webmaster's database entry 46 of first links 52,72,73 the administrator 10 then accesses a given link number, such as the first link 52 to determine if it corresponds with an existing resource, namely, a Webmaster's website such as website 22. The administrator 10 then determines if the site exists at step 119. This process preferably includes outputting the URL address 34 of the Webmaster 14 from the database and accessing through a connection 22. Of course, other methods could be utilized. If the site does not exist, or is otherwise a dead links, then the administrator 10 sends a message to the account Owner 12 at step 121. It is possible that after one or more successive checks of finding no site 22 present, then a separate routine may be utilized to remove the first link 52.

Figure 5B:
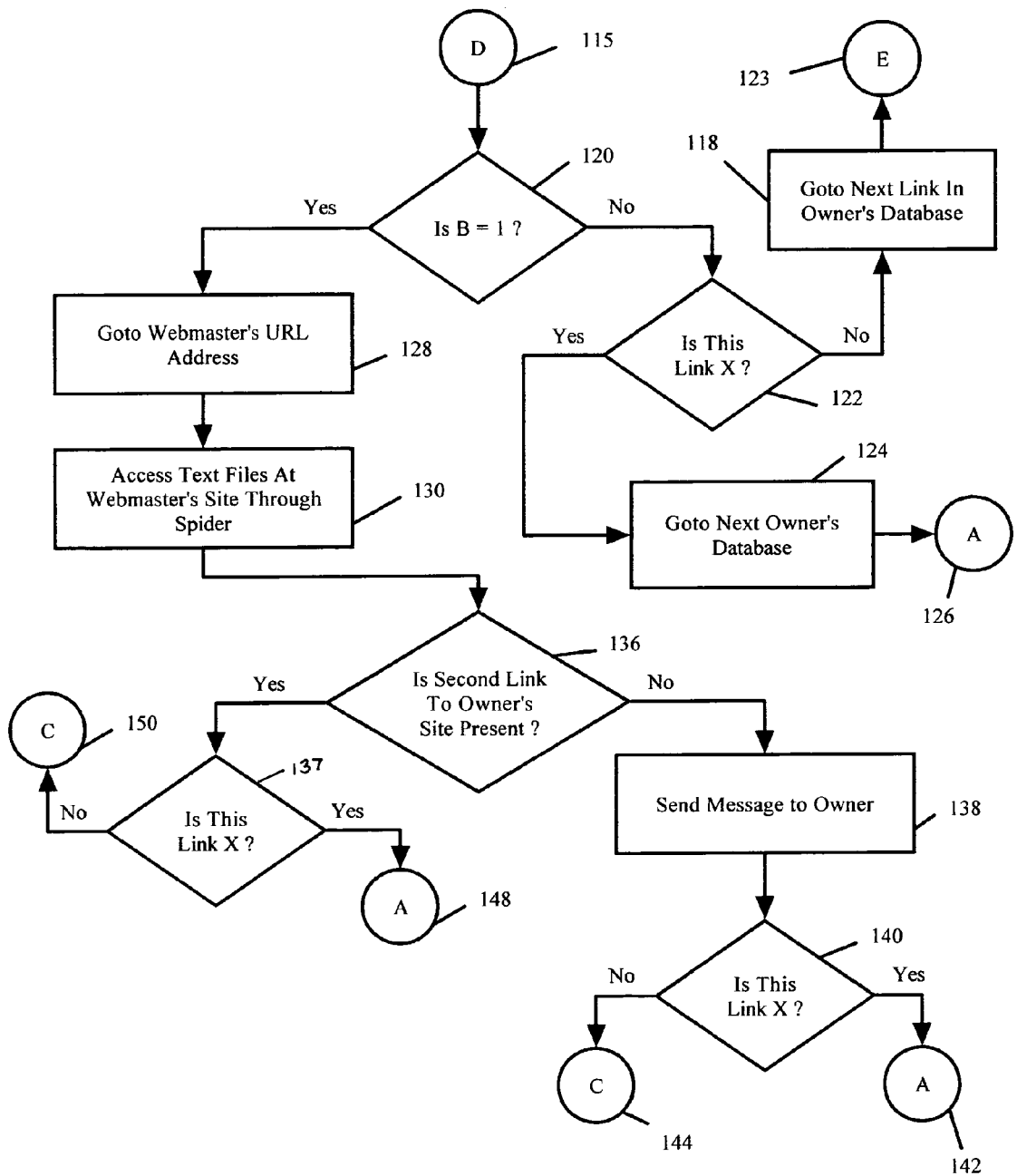

Next, the flow chart continues from step 117 to step 115 in FIG. 5b to continue the flow chart at step 120.

Continuing on in FIG. 5B, if dead link checking is not desired at step 120, then the administrator 10 determines if all the first links have been checked at step 122. If all the checks have not been checked, then the next link to be checked will be accessed from the Webmaster's database 48 at the administrator 12 at step 118 and the process will continue as shown through step 123 linking to step 125 in FIG. 5A. If all first links 52 have been checked at step 122, then the next account Owner's database 48 or database entry 46 may be accessed at step 124 which may deliver the administrator 10 at step 126 to step 94 or 95 depending on whether the next account Owner 12 has indicated a preference for link checking. Of course, default entries could be utilized for preferences.

If the account Owner 12 has requested reciprocal link checking at step 102, then the administrator 10, preferably while at the Webmaster's URL address 34 from step 119 above, spiders, preferably by downloading pages until the link is found, and more preferably remembering where it found the link the last time, to begin at that location again, through the Webmaster's site 22 at step 130.

As the spider is accessing the Webmaster's site 22 at the URL address 34 (step 130), the spider "looks" to see if the This webmaster's site 164 has been linked to somewhere by another site 22 by a second link 90. If the site 164 has been linked to, then the administrator 10 checks to see if all the links for this particular account Owner 12 has been checked in step 136. If all the links have been checked (at step 137), then the flow chart directs to step 148 which will direct the administrator 12 back to step 94 or 95 as discussed above. If all the links have not been checked at step 137 for the particular first Webmaster 12, then step 150 directs the administrator 12 back to step 114 of FIG. 5A to continue with the next link.

If the link to the Webmaster's site is not present at step 136, then a message is preferably sent to the account Owner 12 at step 138. At step 140, the administrator 10 looks to see if all the links have been checked. If all links have been checked for this particular account Owner 12, then step 142 directs the administrator 10 back to step 94, 95. If all links have not been checked, then the step 144 directs the administrator 10 back to step 114 to continue the process through the links as indicated.

Second links are displayed as second link 90 and second link 152 in FIG. 1. In the preferred embodiment the link page 16 is linked by link page link 162 to the account Owner's site 164. After seeing the advantages of the system as described herein, it is hoped that Webmasters such as Webmaster 14 will then subscribe to the administrator's service. Accordingly, a link page link 160 may be established to a Webmaster's link page 154 and the second link 152 may direct an user to the account Owner's site 164. It is believed that the more Webmasters 14 which visit link pages 16 of account Owners 12, the more Webmasters 14 will become account Owners 12.

Figure 6:
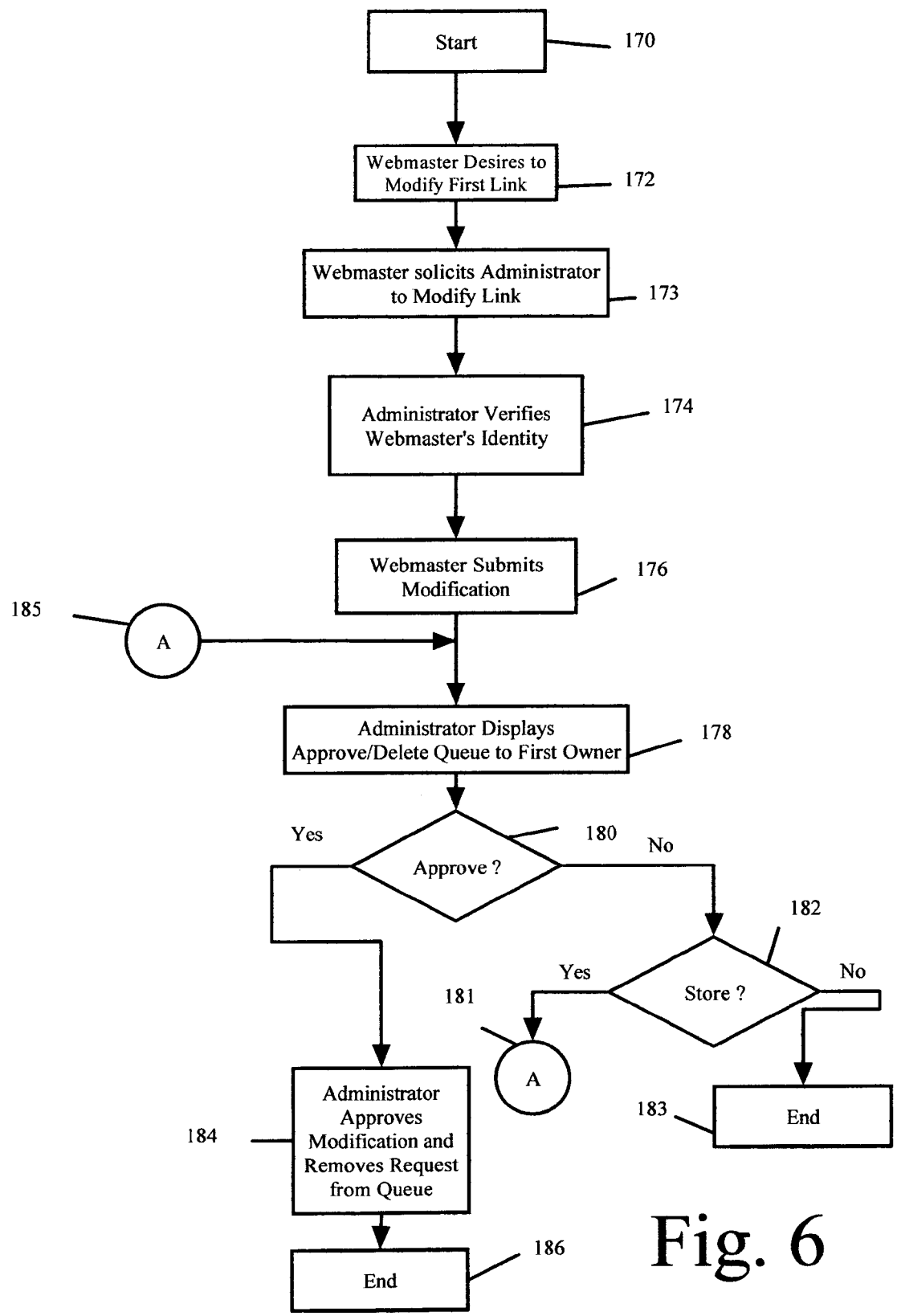
FIG. 6 is a flow chart illustrating the link modification embodiment utilized with FIG. 1.

FIG. 6 is illustrated as a preferred embodiment of a routine for the second Webmaster to modify the first link 52, 72, 74. This process begins at step 170. At step 172, Webmaster desires to modify a link, such as its first link 52 to the Webmaster's site 22. The Webmaster solicits the administrator at step 173 to request to modify the first link 52 to the Webmaster's site 22. At step 174, the administrator 10 verifies the identity of the Webmaster 14 such as by verifying the URL address 34, 42 password of the Webmaster 14, e-mail address 40 of the Webmaster 14, or otherwise verifying the Webmaster's identity. At step 176, the Webmaster submits the proposed modification. The administrator 10 accepts the modification and preferably at step 178 similar to the approve queue similar to the queue 56 generated in the link creation process illustrated in FIG. 3.

Continuing with FIG. 6, the administrator 10 requests the first Webmaster 12 to approve the modification of step 180. If the administrator 10 does not approve a modification at step 180, the administrator 10 may provide the first Webmaster 12 with an opportunity to store the request at step 182. If the first Webmaster 12 elects to store the link at at step 181, the modify queue will be displayed to the first Webmaster at a later time as illustrated through the chart at step 185. If the link is not stored, it may be deleted at step 183. If the first Webmaster 12 elects to approve the modification by the Webmaster 14 at step 180, the administrator adopts the modification at step 184 and the process ends at step 186. The modified first link will then appear on the Webmaster's link page 16.

While preferred embodiments of the invention have been described above, it is to be understood that any and all equivalent realizations of the present invention are included within the scope and spirit thereof. Numerous alterations of the embodiments herein disclosed will suggest themselves to those skilled in the art. However, it is to be understood that the present disclosure relates to the preferred embodiments of the invention, which is for purposes of illustration only, and should not to be construed as a limitation of the invention. All such modifications, which do not depart from the spirit of the invention, are intended to be included within the scope of the appended claims.

I claim:

1. A method of verifying reciprocal linking of a first link between an account Owner's link page and a Webmaster's site and a second link from the Webmaster's site to the account Owner's site using a database including first link information having a link address for a location at the Webmaster's site, the database maintained by an administrator, the method comprising:
   (a) retrieving first link information from the database; then
   (b) determining whether the first link information corresponds to an existing resource at the Webmaster's site by accessing the Webmaster's site using the first link information retrieved from the database; then
   (c) spidering through the Webmaster's site beginning at the link address; and
   (d) verifying through the spidering step that a second link information is present at the Webmaster's site with said second link information corresponding to the second link from the Webmaster's site to the Owner's site.

2. The method of claim 1 further comprising the step of the administrator providing a message to the Webmaster if the second link is not present at the Webmaster's site.

3. The method claim 1 further comprising controlling the link pages at the account Owner's site by said administrator.

4. The method of claim 1 further comprising hosting the administrator on a separate server than the account Owner.

5. A method of establishing a link between a link page of an account Owner and a site controlled by a Webmaster using an administrator, the method comprising:
   (a) soliciting first link information by said administrator from said Webmaster, said first link information comprising at least an address for a URL address at the Webmaster's site;
   (b) formulating a queue by said administrator containing at least some of said first link information;
   (c) presenting said queue to the account Owner for approval;
   (d) creating a first link by said administrator on said account Owner's link page to provide access to said Webmaster's site upon approval of a said first link in said queue.

6. The method of claim 5 further comprising receiving an e-mail address for the Webmaster.

7. The method of claim 5 further comprising receive a category from the Webmaster and said administrator utilizing said category to locate said first link on said account Owner's link page.

8. The method of claim 5 further comprising providing the account Owner the opportunity to store at least some of said first link information in said queue.

9. The method of claim 5 further comprising providing the address for the Webmaster's site as a URL address.

10. The method of claim 5 further comprising representing the queue as html.

11. A method of hosting links at a link page comprising:
    (a) displaying a plurality of links in a first order in a non-editable view; then
    (b) utilizing a formula, creating a second order for said links, said second order being different than said first order; and then
    (c) displaying the plurality of said links in the second order independent of changes made by a human operator associated with any of the plurality of links associated subsequent to the display of the plurality of links in the first order.

12. The method of claim 11 further comprising providing the formula in an alphabetical construction.

13. The method of claim 12 wherein the step of creating the second order of links further comprises assigning a particular letter a number, performing a mathematical operation using said formula to the number assigned to the alphabetical letter, and generating the second order.

14. The method of claim 12 wherein the step of creating a second order of links further comprises providing an alphabetical letter at a beginning of the second order different than a letter beginning the first order.

15. The method of claim 11 wherein the second order of displaying the plurality of said links is in a non-editable view.

* * * * *